(12) United States Patent
Padala et al.

(10) Patent No.: US 8,918,566 B2
(45) Date of Patent: Dec. 23, 2014

(54) SYSTEM AND METHODS FOR ALLOCATING SHARED STORAGE RESOURCES

(75) Inventors: Pradeep Padala, Palo Alto, CA (US);
Arif A. Merchant, Los Altos, CA (US);
Mustafa Uysal, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 584 days.

(21) Appl. No.: 13/130,836

(22) PCT Filed: Jan. 23, 2009

(86) PCT No.: PCT/US2009/031905
§ 371 (c)(1),
(2), (4) Date: Jun. 21, 2011

(87) PCT Pub. No.: WO2010/085256
PCT Pub. Date: Jul. 29, 2010

(65) Prior Publication Data
US 2011/0252166 A1  Oct. 13, 2011

(51) Int. Cl.
*G06F 3/00* (2006.01)
*G06F 5/00* (2006.01)
*G06F 13/12* (2006.01)
*G06F 13/38* (2006.01)
*G06F 3/06* (2006.01)

(52) U.S. Cl.
CPC .............. *G06F 3/0653* (2013.01); *G06F 3/067* (2013.01); *G06F 3/061* (2013.01); *G06F 3/0631* (2013.01)
USPC ................................. 710/74; 710/36; 710/40

(58) Field of Classification Search
CPC ... G06F 3/0653; G06F 3/0659; G06F 3/0631; G06F 3/0613
USPC .................................................. 710/36, 40, 74
See application file for complete search history.

(56) References Cited

U.S. PATENT DOCUMENTS

| 7,362,766 | B2 | 4/2008 | Karlsson et al. |
| 7,941,578 | B2 * | 5/2011 | Kimoto et al. ................... 710/52 |

(Continued)

FOREIGN PATENT DOCUMENTS

| EP | 1158395 A2 | 11/2001 |
| EP | 1336917 A2 | 8/2003 |
| EP | 1482412 A1 | 12/2004 |

OTHER PUBLICATIONS

PCT Search Report/Written Opinion~Application No. PCT/US2009/031905 dated Aug. 27, 2009~11 pages.

*Primary Examiner* — Eric Oberly

(57) ABSTRACT

A system and method for allocating resources on a shared storage system are disclosed. The system 10 can include a shared storage device 12 and a plurality of port schedulers 14 associated with a plurality of I/O ports 16 that are in communication with the shared storage device 12. Each port scheduler 14 is configured to enforce a concurrency level and a proportional share of storage resources of the shared storage device 12 for each application 18 utilizing the associated port. The system 10 can also include a resource controller 17 that is configured to both monitor performance characteristics of the applications 18 utilizing at least one of the I/O ports 16, and to adjust the concurrency level and the proportional share of storage resources parameters of the port schedulers 14 for at least a portion of the applications 18 in order to vary allocation of the resources of the shared storage device 12.

20 Claims, 3 Drawing Sheets

(56) References Cited

U.S. PATENT DOCUMENTS

| | | | |
|---|---|---|---|
| 8,144,719 B2* | 3/2012 | Yadlon et al. | 370/412 |
| 2004/0215858 A1 | 10/2004 | Armstrong et al. | |
| 2004/0243900 A1* | 12/2004 | Henkel | 714/742 |
| 2007/0112723 A1 | 5/2007 | Alvarez et al. | |
| 2008/0244209 A1* | 10/2008 | Seelam et al. | 711/168 |
| 2009/0161684 A1* | 6/2009 | Voruganti et al. | 370/412 |
| 2010/0083262 A1* | 4/2010 | Gulati et al. | 718/102 |

* cited by examiner

SYSTEM AND METHODS FOR ALLOCATING SHARED STORAGE RESOURCES

BACKGROUND

Large scale shared storage systems typically provide data to multiple applications or workload classes with differing performance requirements. Existing Quality of Service (QoS) approaches for controlling resource allocation in such storage systems generally fall into three main categories: (1) I/O scheduling based on fair scheduling algorithms, (2) time slicing at the disk, and (3) control theoretic approaches. A limitation of existing resource allocation techniques is that they focus mainly on fairness but do not account for the trade-off between fairness and I/O efficiency.

When multiple applications with different performance requirements, priorities, and workload characteristics share storage, it can be difficult to ensure that each receives a particular performance requirement. Additionally, higher priority applications can experience lesser performance degradation if shared storage resources are limiting. Often, storage administrators approach the issue by statically partitioning the shared storage between the applications. This approach, however, removes many of the benefits of using shared storage because one application cannot make use of resources left idle by another application.

Accordingly, a variety of problems arises in shared storage allocation situations. First, how can disparate time-varying storage workloads that share a storage device be dealt with to ensure that each storage workload gets at least its target performance? Second, during periods when it isn't possible to meet all target performances, how can shared storage be dynamically allocated so that the highest-priority workloads suffer least? And third, how are the above situations accomplished when the shared storage device has multiple independent ports, and the workloads may use an arbitrary, time-varying combination of the ports to access shared resources?

Thus, effective techniques of allocating shared storage resources to applications executing on an associated processing system, while minimizing idle resources, have proven elusive.

DETAILED DESCRIPTION OF EXAMPLE EMBODIMENTS

Features and advantages of the invention will be apparent from the detailed description which follows, taken in conjunction with the accompanying drawings, which together illustrate, by way of example, features of the present invention.

In a storage system that is shared between multiple applications, each application utilizing the storage system has performance goals specified using metrics of interest to the application, such as latency, throughput, etc. A priority can be assigned to each application denoting the relative importance of that application among the clients of a shared storage system. Thus, one goal of a shared storage system can be to provide a desired level of performance, such as I/O latency or I/O throughput, to applications provided sufficient resources are available. During peak loads, when the amount of shared storage resources may be insufficient to accommodate all applications, it can also be possible to allocate resources to higher priority applications while limiting the resources allocated to lower priority applications.

The present invention provides effective mechanisms for allocating shared storage resources to meet application and/or overall system performance goals, while handling diverse application I/O requirements and changing workload demands and characteristics. As an example, a runaway application can be precluded from drastically reducing the performance of other applications.

Many shared storage systems typically have multiple I/O ports through which applications access shared data. In one embodiment of the present invention, a resource controller is utilized to adjust the parameters of independent port schedulers running at each port. Each application executing on the system can use one or more of the I/O ports to access data, and may send or receive differing amounts of data through each port. The resource controller can adjust the parameter settings of port schedulers at each port, depending on workload conditions, application mix, workload performance targets, etc. The parameter settings across multiple ports can also be coordinated to achieve the overall performance targets of individual applications.

Figure 1:
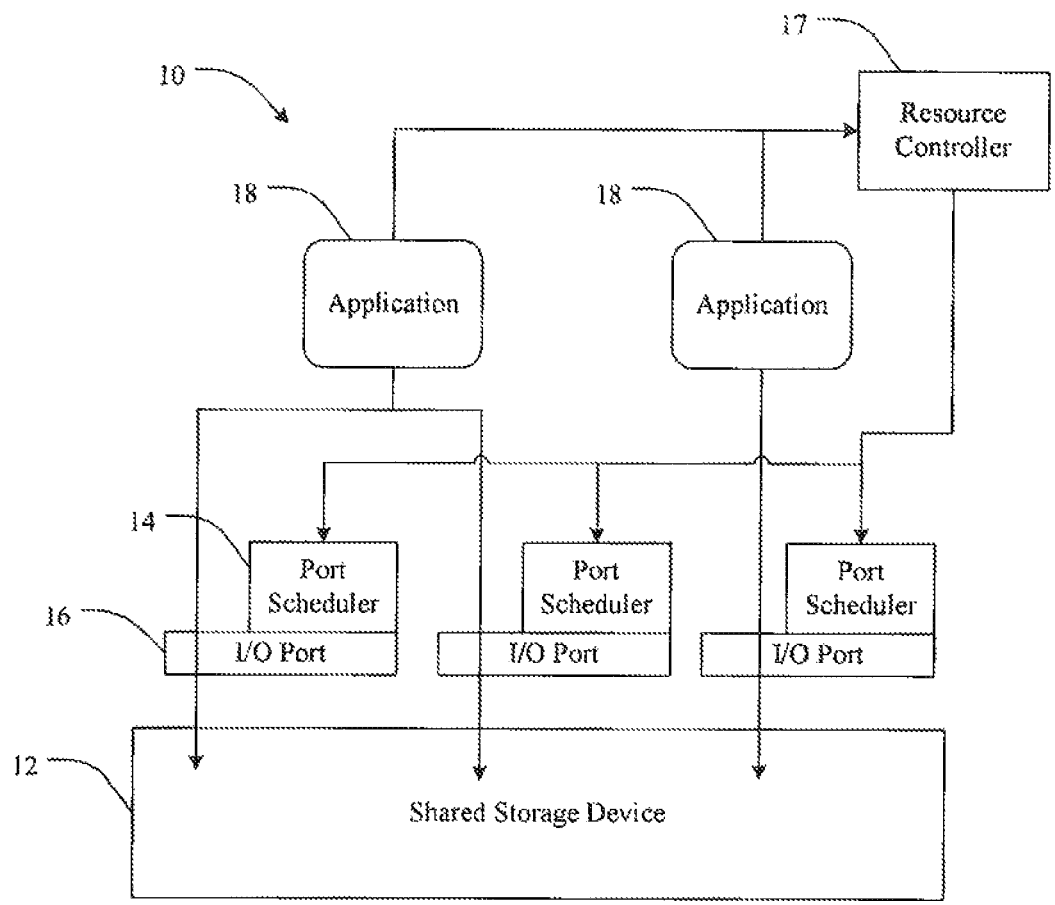
FIG. 1 is a schematic illustration of a system for controlling allocation of shared storage resources in accordance with one embodiment of the present invention.

As is shown in FIG. 1, a system 10 for controlling allocation of shared storage resources is provided. Such a system can include a shared storage device 12, and a plurality of port schedulers 14 associated with a plurality of I/O ports 16 that are in communication with the shared storage device 12. One or more applications 18 that are executing within the system can utilize one or more I/O ports 16 to access the shared storage device. In one embodiment, each port scheduler is configured to enforce a concurrency level and a proportional share of storage resources of the shared storage device for each application utilizing the associated port. In another embodiment, each port scheduler is configured to enforce a concurrency level for each application utilizing the associated port. The system can also include a resource controller 17 that is configured to both monitor performance characteristics of the applications utilizing at least one of the I/O ports, and to adjust the concurrency level and the proportional share of storage resource parameters of the port schedulers for one or more of the applications in order to vary allocation of the resources of the shared storage device between applications. It should be noted that in other embodiments the resource controller can be configured to monitor the concurrency level and not the proportional share of storage resource parameters.

Additionally, in one embodiment, the resource controller can be configured to adjust resource allocations for the I/O ports to compensate for the time-varying characteristics of a workload. As such, when shared resources become limiting at a portion of the plurality of I/O ports, the resource controller can determine the total available share of storage resources and can reallocate shared storage resources to the I/O ports based on that total share. Thus, the resource controller can free up unused or less-used shared storage resources from lower data traffic ports and redistribute these resources to higher data traffic ports in order to increase the efficiency of the system. It should be noted that the total available share of storage resources is the amount of storage resources that are available for redistribution.

Various performance parameters can be tracked and adjusted to effectively allocate shared storage resources across applications executing on a system. In one embodiment, useful parameters can include concurrency level and proportional share. Proportional share can be defined as the proportion of the allocated port resources that are available to a particular application. Concurrency level, on the other hand, can be defined as how many I/O requests from an application are simultaneously allowed to be in process at a port. Both of these parameters are set and monitored at the level of the resource controller. Otherwise, for example, an application utilizing one or more ports can be allocated more shared resources from the entire storage system than are warranted given the priority and/or the desired performance characteristics of the application.

A variety of shared storage device technologies are contemplated that would benefit from the shared storage allocation techniques according to aspects of the present invention. Non-limiting examples include shared storage array systems, network-attached storage systems, shared disk file systems, direct attached storage systems, storage area network systems, redundant array of independent disk (RAID) array systems, etc.

As has been described, a two-tier architecture can be utilized to allocate shared storage resources. At the lower tier, there is a port scheduler at every I/O port that can enforce simple resource allocations per workload. The workload can be any stream of I/Os that can be distinguished from the remaining I/Os and have a common priority and performance target. For example, the workload can be defined as the stream of I/O requests arising from a specified application, a group of specified applications, the I/Os arriving from a specified host computer or a specific I/O adapter at a host, or simply the I/Os that are marked with a common tag. These port schedulers ensure that application workload receives a certain proportion of the total throughput obtained through that I/O port, provided there are sufficient available outstanding I/Os. In addition, these schedulers also limit the concurrency level for each application through a given I/O port to a specified value, or in other words, the total number of I/Os that can be simultaneously processed from a workload is limited. In one embodiment, a single centralized port scheduler can use a single parameter to enforce the resource allocations made at the resource controller. In another embodiment, port schedulers can employ more than one parameter. For example, a share parameter can be used that determines the relative sharing of the local port by the applications and a concurrency bound that determines the relative load introduced to the shared system from the local port. Accordingly, a port scheduler can regulate or limit concurrency level, proportional share, or both concurrency level and proportional share.

The port schedulers can reside at any location within a system from where shared storage allocations can be regulated at the level of the I/O port. In one embodiment, for example, the port schedulers can be located on the shared storage device, or implemented within the shared storage device firmware. In another example, the port schedulers can be located in an application server. In yet another example, the port schedulers can be located anywhere along the data communication path between an application server and a shared storage device.

At the upper tier, a resource controller can be utilized that monitors the performance of the applications executing in the system, and the resource controller can periodically adjust the parameters of the port schedulers in an attempt to meet the performance requirements for an application or applications. In one embodiment, for example, an application may require a specified throughput for I/O requests, and the resource controller can thus adjust the resource allocations at the port schedulers accordingly. For example, consider a system with two workloads: an online transaction processing (OLTP) workload with a strict I/O response time requirement of 0.03 seconds, and a backup application with a long-term throughput requirement of 200 MB/sec. Normally, when the OLTP workload presents a low load, the resource controller may give 70% of the resources at a port to the backup application, because the remaining 30% is adequate to give the OLTP I/O requests a response time of 0.03 seconds or lower. At other times, however, when the OLTP workload presents a burst of requests, the resource controller may temporarily change the resource allocation for the OLTP workload to 90% to enable the OLTP I/O requests to be served in the required 0.03 seconds. Since the backup workload's 200 MB/sec requirement is a long-term one, a temporary reduction in the resource allocation to it will not violate its requirements.

It should be noted that numerous types of applications are contemplated that can be executing in the systems as described herein. Non-limiting examples of applications include web-enabled database applications, client server applications, backup applications, streaming video applications, etc.

Adjustments that are made to the shared storage resource allocations can also be influenced by the priority that has been assigned to particular applications. In one embodiment, for example, the resource controller is configured to vary the concurrency level and the proportional share of storage resources for applications based on an established priority of each of the plurality of applications. Through such a priority mechanism, applications can be allocated resources based on the type of application executing, the resources expended in executing the application, time constraints placed on application execution, etc. In another embodiment, the resource controller is configured to increase the concurrency level and the proportional share of storage resources for applications having a high application priority. By this mechanism, high priority applications can be allocated additional resources in relation to changes, in performance, as well as in relation to the relative priorities compared to other applications using the system.

In yet another embodiment, the resource controller is configured to decrease the concurrency level and the proportional share of storage resources for applications having a low priority. By this mechanism, shared storage resources can be freed up from low priority applications as performance changes. In this case, the freed resources can be reallocated to higher priority applications, or they can be reserved for future reallocations. In a further embodiment, the resource controller is configured to vary the concurrency level for applications based on an established priority of each of the plurality of applications.

Because of the complex interaction between dynamic workload characteristics, resource allocations, and performance, such control is often non-trivial. Large scale storage systems can employ multiple independent proportional share port schedulers as they typically have large numbers of interface ports for storage clients, even though the clients may access the same shared resources through the many ports. As a result, individual port schedulers can only enforce resource allocations locally for an associated port but cannot enforce such resource allocations globally. If an application uses multiple ports, or independent applications use independent ports, and thus independent schedulers, the parameters of each individual port scheduler need to be adjusted in a coordinated fashion so as to meet the performance targets of each individual application.

In one embodiment, the resource controller sets share parameters to enforce goals of each independent application in two steps. First, the resource controller determines a "global" or overall share for each application based on the application's recent share allocation, its target performance, and its actual performance. This global share determines the overall resource allocation for each application across all ports.

In the second step, the resource controller distributes each application's global shares to port controllers associated with individual local ports. This step allocates each application a local share at each port in proportion to the total I/O load that the application places on the port. A scheduler variable called "demand" can be implemented to achieve this. In one specific embodiment, the demand, or $D(i,j)$, could be the fraction of the I/Os sent by workload i to port j. In another specific embodiment, the demand could be the number of I/Os from workload i currently pending at port j. Additionally, let $S(i)$ be the global "share" of this workload computed by the resource controller. The concurrency parameter of the workload i at port j is then set as in Equation (I):

$$\text{concurrency}(i,j)=D(i,j)*S(i)*\text{MaxConcurrency} \quad (I)$$

The share parameter of workload i at pots j is coupled with the concurrency parameter, and is set as in Equation (II):

$$\text{share}(i,j)=D(i,j)*S(i) \quad (II)$$

Here, MaxConcurrency refers to a globally set configuration parameter for the resource controller that determines the total number of I/O requests that the resource controller allows the independent port schedulers to send to the shared storage device.

It should be noted that there are various benefits in addition to those described that can be achieved by the present method. For example, the present method functions even if some workloads only use a subset of the ports, since the demand on the unused ports is zero, none of the resources are allocated at the unused ports. The method additionally functions if there is a non-uniform distribution of load, or if the load distribution varies over time. It also functions if the I/O requests sent to one of the ports are "heavier" than another, since the number of requests pending at the port will build up, causing the measured "demand" to grow there, resulting in a higher resource allocation at that port.

The internal design of the resource controller may be at least a two-layer design. The first layer called AppController determines application requirements using recursive least squares (RLS) modeling and optimization. In one embodiment, AppController is a combination of 1) an RLS modeler which attempts to construct a relationship between the resource allocation and the application performance, and 2) a controller that uses this model to determine how much resource should be allocated for that application in the next control interval. This allocation depends on the model, and also other parameters of the controller such as stability (i.e., so the resource allocations are not oscillating too much) or aggressiveness (i.e., if the current allocation is too far from the amount needed to achieve the target, how fast you want to adjust it to match the target). Further details regarding RLS modeling and optimization are described in Padala et al., Automated Control of Multiple Virtualized Resources, HP Labs Technical Report HPL-2008-123, Oct. 6, 2008, which is incorporated herein by reference. In each control interval, the AppController determines the resources desired by each application in order to meet performance goals, based on the recent history of the application's workload demands, the resources allocated to the application, and the performance achieved. The second layer, called ArbiterController, arbitrates between the AppController requests using the total amount of shared resources available at the storage device. In one embodiment, the ArbiterController grants all the AppController requests if it is possible. If not, the share is divided in a way that optimizes a utility function that is based on the priority of the applications and their requirements. In another embodiment, the ArbiterController distributes the excess of shared storage resources among the applications based on their priority.

It should be noted that the resource controller can reside at any place within a system where application performance can be monitored and shared storage allocation changes can be communicated to the port controllers. For example, the resource controller may be located within a server that is in communication with the shared storage device. In another embodiment, the resource controller can be located on the shared storage device. In yet another example, the resource controller can be located anywhere along the data communication pathway between a server and a shared storage device.

Figure 2:
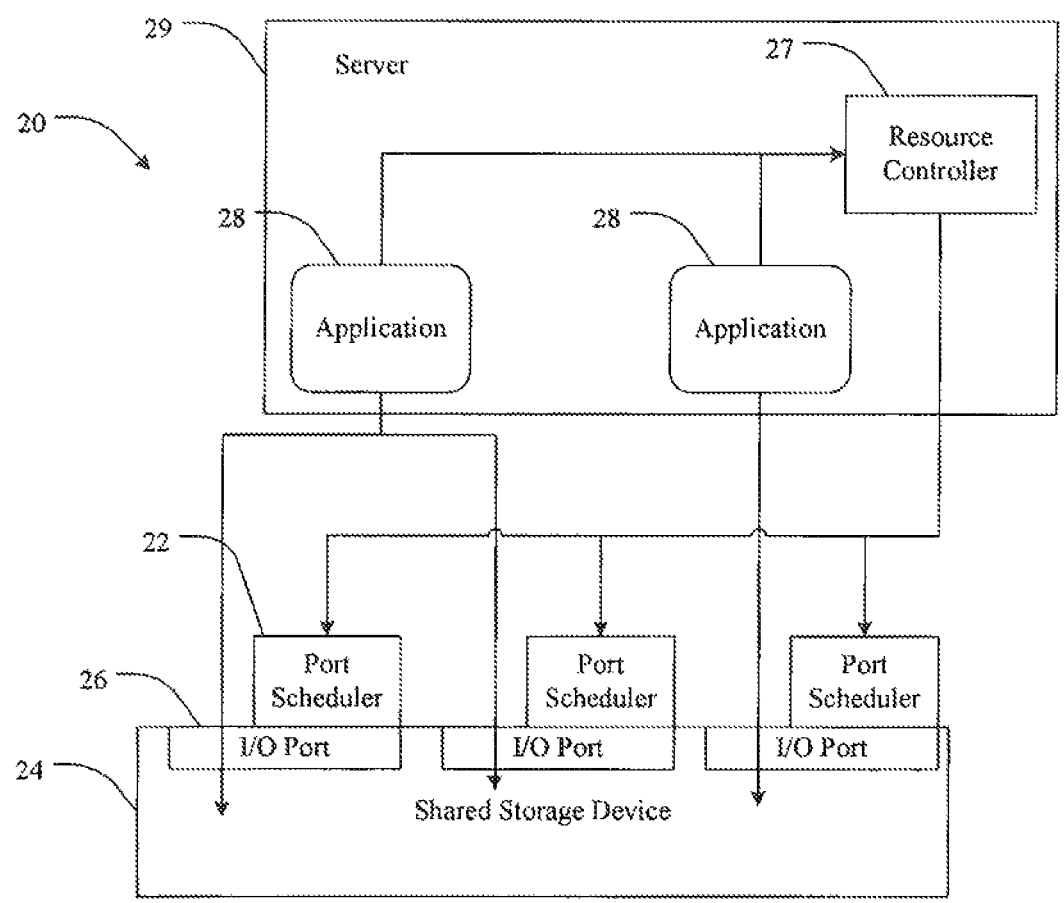
FIG. 2 is a schematic illustration of a system for controlling allocation of shared storage resources in accordance with another embodiment of the present invention.

In another embodiment of the present invention, as is shown in FIG. 2, a system 20 for controlling allocation of shared storage resources is provided. Such a system can include a shared storage device 24, and a plurality of port schedulers 22 associated with a plurality of I/O ports 26 that are in communication with the shared storage device. The port schedulers are configured to provide an application 28 utilizing the associated I/O port 26 with a proportion of total throughput obtained through that I/O port and a concurrency limit. Additionally, in this embodiment the port schedulers are located on the shared storage device. One or more applications that are executing on the system utilize one or more I/O port to access the shared storage device. Each port scheduler is configured to enforce a concurrency level and a proportional share of storage resources of the shared storage device for each application utilizing the associated port. The system can also include a resource controller 27 that is configured to monitor a performance characteristic of all applications utilizing the plurality of I/O ports, and to periodically adjust the proportion of total throughput and the concurrency limit in order to meet an execution performance goal of applications utilizing the plurality of I/O ports. Additionally, in this embodiment the resource controller is located on a server 29 that is in communication with the shared storage device.

In other embodiments, the resource controller 27 is further configured to determine an overall share of storage device resources for an application 28 executing on the system, and to distribute a portion of the overall share to each I/O port 26 through which the application will be interfacing. In yet other embodiments, the resource controller is further configured to periodically adjust the proportion of total throughput and the concurrency limit based on a prioritization of the application, where the proportion of total throughput and the concurrency limit are periodically adjusted more frequently for applications having a higher priority as compared to applications having a lower priority or no priority.

Figure 3:
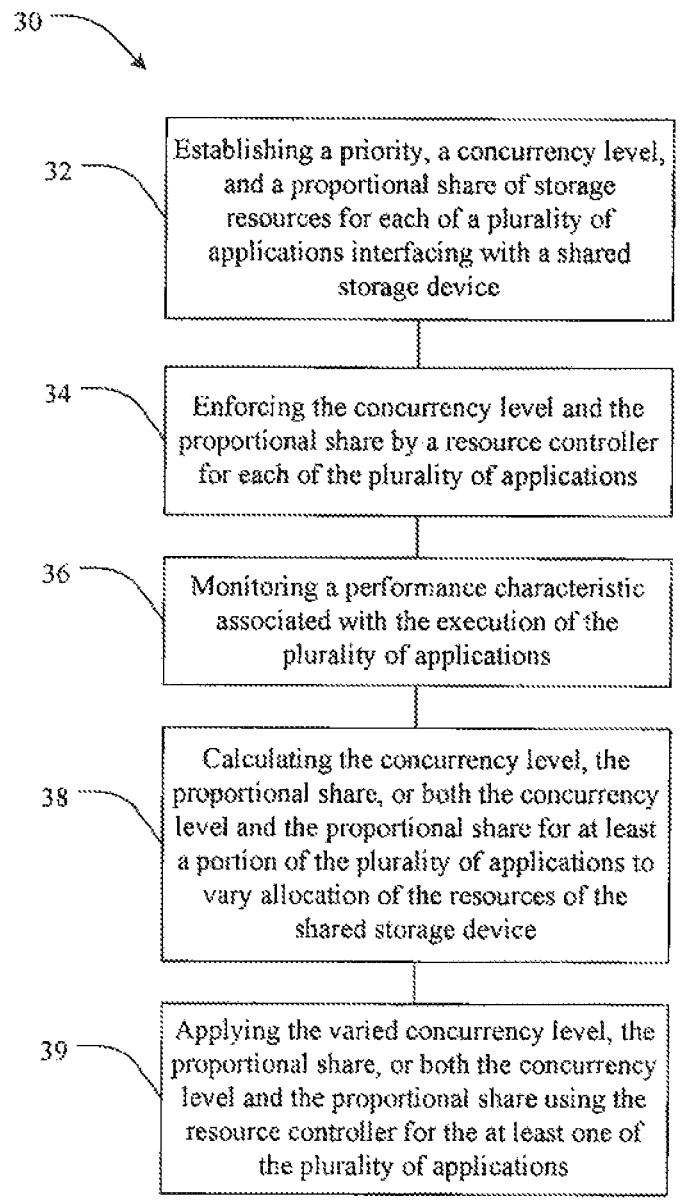
FIG. 3 is a flow chart depicting a method of controlling allocation of shared storage resources in accordance with yet another embodiment of the present invention.

A method for controlling allocation of shared storage resources is additionally provided. In one embodiment, as is shown in FIG. 3, such a method 30 can include establishing a priority, a concurrency level, and a proportional share of storage resources for each of a plurality of applications interfacing with a shared storage device 32, enforcing the concurrency level and the proportional share by a resource controller for each of the plurality of applications 34, monitoring a performance characteristic associated with the execution of the plurality of applications 36, calculating the concurrency level, the proportional share, or both the concurrency level and the proportional share for at least a portion of the plurality of applications to vary allocation of the resources of the shared storage device 38, and applying the varied concurrency level, the proportional share, or both the concurrency level and the proportional share using the resource controller for the at least one of the plurality of applications 39.

In another embodiment of the present invention, calculating the concurrency level, the proportional share, or both the concurrency level and the proportional share can further include calculating the concurrency level, the proportional share, or both the concurrency level and the proportional share based on the application priority of each of the plurality of applications, as is described more fully herein. Following the calculation of the concurrency level, the proportional share, or both the concurrency level and the proportional share based application priority, the concurrency level, the proportional share, or both the concurrency level and the proportional share can be increased for applications having higher application priorities as compared to applications having lower application priorities. Alternatively, the concurrency level, the proportional share, or both the concurrency level and the proportional share can be decreased for applications having lower application priorities as compared to applications having higher application priorities.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for controlling allocation of shared storage resources, comprising:
    a shared storage device having a plurality of I/O ports:
    a plurality of port schedulers associated with the plurality of I/O ports in communication with the shared storage device, each port scheduler being configured to enforce a concurrency level for each application utilizing the associated port; and
    a resource controller configured to monitor a performance characteristic of a plurality of applications, wherein the plurality of applications utilizes at least one of the plurality of ports, and to adjust the concurrency level of the port schedulers for at least a portion of the plurality of applications to vary allocation of the resources of the shared storage device.

2. The system of claim 1, wherein the resource controller is configured to vary the concurrency level for applications based on an established priority of each of the plurality of applications.

3. The system of claim 2, wherein the resource controller is configured to increase the concurrency level for applications having a high application priority.

4. The system of claim 1, wherein each port scheduler is configured to enforce a proportional share of storage resources of the shared storage device, and the resource controller is configured to adjust the proportional share of storage resources of the port schedulers for at least a portion of the plurality of applications to vary allocation of the resources of the shared storage device in response to a changing workload.

5. The system of claim 4, wherein the resource controller is configured to vary the concurrency level and the proportional share of storage resources for applications based on an established priority of each of the plurality of applications.

6. The system of claim 4, wherein the resource controller is configured to adjust the concurrency level of the port schedulers for at least a portion of the plurality of applications to vary allocation of the resources of the shared storage device in response to a changing workload.

7. The system of claim 1, wherein the performance characteristic is selected from the group consisting of throughput, bandwidth, latency, and combinations thereof.

8. The system of claim 1, wherein the plurality of port schedulers is located on the shared storage device.

9. The system of claim 1, wherein the resource controller is located on a server in communication with the shared storage device.

10. A method of controlling allocation of shared storage resources, comprising:
    calculating a total available share of storage resources;
    dividing, the total available share into a plurality of port share allocations based on per-port demands of a plurality of ports;
    establishing a priority and a concurrency level for each of a plurality of applications interfacing with a shared storage device;
    enforcing the concurrency level within the plurality of port share allocations using a resource controller configured to monitor each of the plurality of applications;
    monitoring a performance characteristic associated with the execution of the plurality of applications;
    calculating the concurrency least for at least a portion of the plurality of applications to vary allocation of the resources of the shared storage device; and
    applying the varied concurrency level using the resource controller for the at least one of the plurality of applications.

11. The method of claim 10, wherein calculating the concurrency level, a proportional share of storage resources, or both the concurrency level and the proportional share further comprises calculating the concurrency level, the proportional share, or both the concurrency level and the proportional share based on the application priority of each of the plurality of applications.

12. The method of claim 10, further comprising:
    establishing a proportional share of storage resources for each of plurality of applications interfacing with a shared storage device; and
    enforcing the proportional share of storage resources within the plurality of port allocations using the resource controller.

13. The method of claim 12, further comprising:
    calculating the proportional share for at least a portion of the plurality of applications to vary allocation of the resources of the shared-storage device; and
    applying the varied the proportion share using the resource controller for the at least one of the plurality of applications.

14. The method of claim 10, further comprising calculating the concurrency level based on the application priority of each of the plurality of applications.

15. The method of claim 10, wherein the performance characteristic is selected from the group consisting throughput, bandwidth, latency, and combinations thereof.

16. A system for controlling allocation of shared storage resources, comprising:
    a shared storage device having in plurality of I/O ports;
    an application on a server;

a plurality of port schedulers associated with the plurality of I/O ports in communication with the shared storage device, each port scheduler being configured to provide an application utilizing the associated I/O port with a proportion of total throughput obtained through that I/O port and a concurrency limit; and a resource controller in communication with the plurality of port schedulers, the resource controller being configured to monitor a performance characteristic of all applications that are utilizing the plurality of I/O ports, and to periodically adjust the proportion of total throughput and the concurrency limit in order to meet an execution performance goal of applications utilizing the plurality of I/O ports.

17. The system of claim 16, wherein the resource controller is further configured to:
determine an overall share of storage device resources for an application executing on the system; and
distribute a portion of the overall share to each I/O port through which the application will be interfacing.

18. The system of claim 16, wherein the shared storage device is a shared storage array.

19. The system of claim 16, wherein the plurality of port schedulers is located on the shared storage device.

20. The system of claim 16, wherein the resource controller is located on a server in communication with the shared storage device.

* * * * *